United States Patent Office 3,194,728
Patented July 13, 1965

3,194,728
PAPER SIZED WITH FATTY ACID ESTERS OF METHYLOLATED ROSIN, METHOD OF MAKING SAME AND SIZE PASTE THEREOF
Joseph H. Stump, Jr., Pensacola, Fla., assignor, by mesne assignments, to Tenneco Chemicals, Inc., a corporation of Delaware
No Drawing. Filed Feb. 2, 1962, Ser. No. 170,789
11 Claims. (Cl. 162—179)

The present invention relates to the sizing of paper and other water-laid cellulose webs and relates to a novel paper size. The present invention is particularly concerned with the utilization in paper size of fatty acid esters of methylolated rosin and the reaction products of such ester-acids with unsaturated aliphatic dicarboxylic acids.

It is well known that rosin including tall oil rosin can be used in the preparation of paper sizes. It also is well known that refined tall oil which is a mixture of resin acids and fatty acids cannot be used satisfactorily in the preparation of paper size as these fatty acids in sized paper render the paper highly susceptible to water penetration.

A primary object of the present invention is to utilize tall oil acids in the production of paper size that is light in color, that renders the paper sufficiently resistant to water penetration, and that is economical to produce.

We have found that the ester-acids produced by reacting tall oil fatty acids with methylolated tall oil rosin acids can be effectively utilized in the sizing of paper. It also has been found that if the forementioned ester acids are reacted with an aliphatic, unsaturated dicarboxylic acid containing one carbon to carbon double bond, for example, maleic acid, fumaric acid or their anhydrides, the resulting reaction product has much better sizing properties than the unmodified ester-acids.

The ester-acids of primary economical interest are those produced by esterifying methylolated tall oil rosin with tall oil fatty acids. However, other natural resin acids, such as wood or gum rosin, may be used and any other saturated or unsaturated fatty acid, or mixtures thereof, containing from 16 to 20 carbon atoms can be used. The ester-acids may be prepared by heating and reacting formaldehyde, tall oil rosin and tall oil fatty acids to effect methylolation of the rosin acids which in turn esterify the fatty acids. The preparation of these acid-esters is described fully in United States Patent No. 2,744,889. Many of the ester-acids described in this patent can be used in carrying out the present invention.

The chemical reactions involved in the methylolation of tall oil rosin acids and esterification of the methylolated rosin acids with tall fatty acids is illustrated by the following equation for abietic acid, formaldehyde, and oleic acid:

(A) $C_{19}H_{29}COOH + HCHO \rightarrow HOCH_2C_{19}H_{28}COOH$ (B) $C_{18}H_{34}COOH + HOCH_2C_{19}H_{28}COOH$
$\rightarrow C_{18}H_{34}COOCH_2C_{19}H_{28}COOH + H_2O$ All three reactants may be mixed and heated or the tall oil rosin acids and formaldehyde partially reacted and the fatty acids added and the reactions completed.

Tall oil acids containing the rosin and fatty acids in the desired proportions may be used or refined tall oil fatty acids and refined tall oil rosin acids may be mixed in the proper proportions. The proportions of the resin acids and fatty acids should be about those required to produce the ester acids. The two types of acids combine in about equal molal amounts. Preferably, only a slight excess of fatty acids should be used, that is, not more than 1.1 moles of fatty acids per mole of rosin acids so that the fatty acids are substantially completely reacted with methylolated rosin acids, thereby avoiding the presence of a substantial amount of unreacted fatty acids in the end product. While a large excess of rosin can be tolerated, I prefer to use at least 0.5 mole of fatty acids per mole of rosin acids which is 50% excess rosin acids. The excess rosin will not, of course, be esterified and will not be converted to an ester-acid. The molecular weight proportions are 48 parts fatty acids and 52 parts rosin acids calculated as oleic acid and abietic acid respectively. In general, refined tall oil fatty acids will have an acid number of from 190 to 199, whereas oleic acid has an acid number of 200. Refined tall oil rosin acids often have an acid number of about 170–180, whereas pure abietic acid has an acid number of 186. In practice, very good results are obtained with equal amounts of the two types of acids, although the combining weights of the refined tall oil fractions is usually about 280 parts of the fatty acids to 300 parts of the resin acids. If the acid numbers of the tall oil fractions or the degree of purity of the fractions varies materially, this of course should be taken into consideration.

The proportion of formaldehyde, whether as a gas, an aqueous solution, or a polymer which depolymerizes to release formaldehyde, is used in excess of the stoichiometric amount as a result of losses which take place. The stoichiometric amount is one mole of formaldehyde per mole of rosin acids. Excellent results have been obtained using about 10% of paraformaldehyde based on the total weight of acids or 20% of paraformaldehyde based on the weight of rosin. Large excesses do not materially change the end product and constitute a loss. However, a large excess may be used.

The temperatures used in the preparation of the ester-acids are set forth in the previously mentioned patent. Briefly stated, the reaction mixture is gradually heated from about 100° C. to about 150° C. until about 80% of the expected drop in acid number is achieved. The reaction is then completed by heating to a temperature in the range of 200° C. to 250° C., with the preferred maximum temperature being about 225° C.

The course of the reaction can be followed by the drop in acid number. The ester-acid has a much larger molecular weight than the resin acids and as the acid value of the ester-acid is due only to the carboxyl group of the resin acid, the acid value of the ester-acid is much lower than that of the resin acids. Thus, for pure abietic acid and pure oleic acid, the theoretical acid value of the ester acid should be 94 compared to an acid number of 186 for the abietic acid, as the molecular weight of the ester-acid is almost twice that of abietic acid. In practice, the theoretical acid number is approached but not reached, due in part to impurities and possibly in part to the presence of resin acids of non-abietic type. The preferred ester-acids are the completely reacted ester-acids, that is, ester-acids which do not materially change in acid number upon heating for one hour at 225° C. In reacting equal quantities of refined tall oil fatty acids having an acid value of 197 and refined tall oil rosin acids having an acid value of about 175, it has been found that ester-acids having an minimal acid value of 100 can be obtained and that ester-acids having an acid value of 110 can be used. Ester-acids produced in this manner from substantially equal molal amounts of the two types of acids having higher acid values are materially inferior. If there is an excess of fatty acids or rosin acids, this must be taken into consideration when calculating the theoretical acid number. In practice, we prefer not only the stable ester-acids, but those ester-acids having an acid value not higher than about 110% of the lowest acid number which can be attained. An exception is when there is present an excess of rosin. In other words, the fatty acids and the substantially equal molal amount of resin acids should be reacted and have an acid value of 110, or less, but the entire reaction product may have a higher acid number as the result of excess rosin.

It has been found that sizes which impart much higher resistance to water penetration can be prepared from ester-acids which have been reacted with maleic acid or fumaric acid, mixtures thereof, or anhydrides of these acids. The amount of maleic acid, for example, may be in the range of from 1% to 10% by weight of the ester-acids. About 3% to 5% of maleic acid provides the best improvement per unit of cost as the larger amounts do not produce a proportionate increase.

While not limited to any particular theory, it is believed the primary reaction between the maleic acid and the ester-acid is an addition reaction involving carbon to carbon double bonds in both the maleic acid and ester-acid so that the product is an adduct in which the carboxyl group of the ester-acid and the fatty acid radical of the ester-acid are not materially affected. The maleated ester-acid has a higher acid value as a result of the additional carboxyl groups present in the combining radical of the maleic acid. This reaction takes place readily upon heating and will take place, for example, upon heating the reactants to 100–250° C. There is no indication that the particular temperature used materially influences the characteristics of the reaction product as long as the maleic acid is substantially completely reacted.

The sizes are prepared by saponifying the ester-acids or the adducts of the ester-acids to form the sodium or potassium salts in substantially the same manner as rosin sizes are prepared from rosin. If an excess of rosin is present which may be only partially methylolated, then the mixture is considered as a mixture of rosin and ester-acids and both components are saponified. The ester-acids will be referred to in discussing the preparation of sizes. However, the same remarks are applicable to the maleated ester-acids unless indicated otherwise. The ester-acids preferably are warmed and usually mixed with an aqueous solution of a sodium or potassium compound, such as sodium or potassium hydroxide or carbonate. The amount and concentration of the alkaline solution usually is such that the resulting emulsion contains about 60 to 80% by weight of sizing solids, although other concentrations may be used. The amount of water soluble sodium compound is predetermined so that the size has an acid number in the range of 0–50. If desirable, the size can be dried for storage although this is not a preferred procedure.

The novel size of the present invention may be used in the same manner as the ordinary rosin sizes by adding a dilute aqueous solution of the size to an aqueous suspension of paper-making cellulose fibers, precipitating the size on the fibers by means of alum, sheeting the fibers to form a web, and drying the web to form paper. The amount of size used may be varied widely depending upon the results desired but in general, the amount of size will be between ¼% and 5% and usually between ½% and 4%, based on the dry weight of the fibers. The amount of alum added may vary from ½% to 5% but usually will be from 1% to 2% by weight of the dry fibers.

The following examples are given for purposes of illustration. All parts and percentages are by weight.

Example 1

An ester-acid was prepared from a refined tall oil having an acid number of 187 and containing 2.5% unsaponifiable material 51.2% rosin acids and 46.3% fatty acids. Six hundred parts of this tall oil and 60 parts of paraformaldehyde were gradually heated through the range of 110°–150° C. until about 80% of the expected drop in acid value was obtained. The reaction was completed by heating the reaction mixture to 225° C. The ester-acid had an acid value of 110.

A size was prepared by warming 322 g. of this ester-acid and then mixing it with a solution of 19 g. of sodium hydroxide in 134 g. of water to produce a paste size having an acid value of 22 and containing 70.4% solids.

Example 2

An ester-acid was prepared by the same general procedure described in Example 1. However, the ester-acid product was not stable and was not completely reacted. It had an acid value of 113. A paste size was produced by saponifying the ester-acid with an aqueous solution of sodium hydroxide. The paste size had an acid value of 2.7 at 75.2% solids.

Example 3

An ester-acid was prepared by the same general procedure described in Example 1 and from the same tall oil. The stable, completely reacted product had an acid value of 100. A paste size was prepared by saponifying a portion of the ester-acid with an aqueous solution of sodium hydroxide. The paste size had an acid value of 2.7 and contained 73% solids. The percentage of solids is based on the amount of both the saponified and unsaponified ester-acid in the total amount of paste.

Example 4

100 grams of the ester-acid of Example 3 and 4 grams of maleic anhydride were heated so that the temperature rose from 150 to 250° C. in one hour. The maleated ester-acid was saponified with sodium hydroxide in water to form a paste size containing 70% solids and having an acid value of 41.

Paper hand sheets sized with sizes of Examples 1 through 4 were prepared and tested by standard laboratory procedures. Semibleached kraft pulp was beaten to a Canadian Standard Freeness of 600 at 2.5% consistency with water adjusted to pH 4.5 with sulfuric acid. To this pulp there was added in increments diluted paste size and papermaker's alum to provide the desired level of size and alum. The final pulp was adjusted to pH 4.5 with sulfuric acid. The hand sheets were made in a Noble and Wood hand-sheet machine using recycle water at pH 4.5 for dilution so that each 8 inch by 8 inch sheet weighed 2.5 grams (dry basis). The sheets were pressed and dried and conditioned at 90° F. and 40% relative humidity for at least two hours. These conditioned sheets were tested as hereinafter described.

Example 5

Handsheets containing the size of Example 1 were tested for water absorption by the Cobb Test, TAPPI Method Number T 441 M–60, with the results being expressed as grams of water absorbed per square meter of paper. At a size level of 1.5% and an alum level of 1.5%, the Cobb Test value was 37 as compared to a value of 60 for a commercial pale rosin size under the same conditions.

Example 6

Conditioned handsheets were tested for acidic ink penetration and also for water penetration on a Model 320-2 Fotosize Penetration Tester available from Thwing-Albert Instrument Company. An aqueous solution of Soluble Blue 2 B Extra (National Aniline), Acid Blue 22 extra strength, Color Index No. 42,755, was used for the water penetration test. This tester is a null balance indicator of the amount of light reflected from the under surface of the paper before and after application of the penetrant. The measure of penetration is shown by the loss of reflectivity of the under surface. The results are expressed in seconds, the length of time required to reduce the reflectivity of the under surface a standard amount as measured by photoelectric cells. Thus, the longer the period, the greater the resistance is to liquid penetration.

The handsheets were sized with the sizes of Examples 2, 3 and 4, respectively, and in each instance the size level was 1% and the alum level was 1½%.

The handsheets prepared with the partly reacted size of Example 2, had poor resistance to ink and water penetration. The penetration time for water was about 7 seconds and the ink penetrated in 2 seconds.

For the hand sheets sized with the substantially completely reacted size of Example 3, the water penetration time was 79 seconds and the ink penetration time was about 3 seconds.

For the handsheets sized with the maleic-ester-acid adduct of Example 4, the water penetration time was 141 seconds and the ink penetration time was about 4 seconds. Reacting the ester-acid with maleic anhydride resulted in a size which almost doubled the water resistance of the paper as compared to unmodified ester-acid.

The present ester-acid sizes may be used alone for sizing paper or may be used in combination with other paper sizes, such as, rosin sizes which include sizes prepared from gum rosin, wood rosin, and tall oil rosin as well as modified rosins such as disproportionated rosin, hydrogenated rosin, and rosin reacted with maleic anhydride or formaldehyde. It will be noted that if there is an excess of tall oil rosin present when the rosin is methylolated and partially esterified with tall oil fatty acids, the size is a mixture of ester-acids and rosin.

I claim:

1. Paper comprising a water-laid web of cellulosic fibers carrying alum-precipitated size, said size having an acid value in the range of 0–50 and being the alkali metal saponification product of a material selected from the group consisting of ester-acid of fatty acid containing 16 to 20 carbon atoms and methylolated rosin acids, reaction product of such an ester-acid with from 1% to 10% by weight of an unsaturated aliphatic dicarboxylic acid, and reaction product of such an ester-acid and the anhydride of an unsaturated aliphatic dicarboxylic acid, said ester-acid having an acid value of not more than 110, and the amount of said size carried by the web being in the range of from 0.25% to 5% by weight of the fibers on a dry basis.

2. In the method of manufacturing sized paper from a water-laid web of cellulosic fibers comprising forming a dilute aqueous suspension of paper-making cellulose fibers, adding thereto an aqueous dispersion of size having an acid value in the range of 0–50, precipitating the size on the papers with the addition of alum to the suspension, sheeting the said fibers to form a web, and drying said web, wherein said size is the alkali metal saponification product of a material selected from the group consisting of ester-acid of fatty acid containing 16 to 20 carbon atoms and methylolated rosin acids, reaction product of such an ester-acid with from 1% to 10% by weight of an unsaturated aliphatic dicarboxylic acid, and reaction product of such an ester-acid and the anhydride of an unsaturated aliphatic dicarboxylic acid, said ester-acid having an acid value of not more than 110, and the amount of said size carried by the web being in the range of from 0.25% to 5% by weight of the fibers on a dry basis.

3. In the method of manufacturing sized paper from a water-laid web of cellulosic fibers comprising forming a dilute aqueous suspension of paper-making cellulose fibers, adding thereto an aqueous dispersion of size having an acid number in the range of 0–50, precipitating the size on the papers with the addition of alum to the suspension, sheeting the said fibers to form a web, and drying said web, wherein said size is the alkali metal saponification product of an ester-acid of from 0.5 to 1.1 molal equivalents of tall oil fatty acids substantially completely reacted with one molal equivalent of methylolated tall oil rosin acids, the amount of said ester-acid carried by the web being in the range of ¼% to 5% of the fibers on a dry basis.

4. In the method of manufacturing sized paper from a water-laid web of cellulosic fibers comprising forming a dilute aqueous suspension of paper-making cellulose fibers, adding thereto an aqueous dispersion of size having an acid value of 0–50, precipitating the size on the papers with the addition of alum to the suspension, sheeting the said fibers to form a web, and drying said web, wherein said size is the alkali metal saponification product of the reaction product of from 1 to 10 parts by weight of maleic anhydride and 100 parts by weight of an ester-acid of fatty acid containing from 16 to 20 carbon atoms and methylolated rosin acids, said ester-acid having an acid number not higher than 110, and the amount of said reaction product carried by the web being in the range of ¼% to 5% by weight of the fibers on a dry basis.

5. In the method of manufacturing sized paper from a water-laid web of cellulosic fibers comprising forming a dilute aqueous suspension of paper-making cellulose fibers, adding thereto an aqueous dispersion of size having an acid value of 0–50, precipitating the size on the papers with the addition of alum to the suspension, sheeting the said fibers to form a web, and drying said web, wherein said size is the alkali metal saponification product of the reaction product of from 1 to 10 parts by weight of maleic anhydride and 100 parts by weight of an ester-acid of from 0.5 to 1.1 molal equivalents of tall oil fatty acids substantially completely reacted with one molal equivalent of methylolated tall oil rosin acids, and the amount of said reaction product carried by the web being in the range of ¼% to 5% by weight of the fibers on a dry basis.

6. An aqueous paste for sizing paper containing water and from 60% to 80% of the alkali metal saponification product of ester-acid of fatty acid containing from 16 to 20 carbon atoms and methylolated rosin acids, said paste having an acid value in the range 0–50.

7. An aqueous paste for sizing paper having an acid value in the range 0–50 and containing water and from 60% to 80% of the alkali metal saponification product of the reaction product of (1) 1 to 10 parts by weight of maleic anhydride and (2) 100 parts of an ester-acid of tall oil fatty acids and about an equivalent amount of methylolated tall oil rosin acids.

8. Paper comprising a water-laid web of cellulosic fibers carrying alum-precipitated size in an amount in the range of 0.25% to 5% of the fibers on a dry basis, said size being the alkali metal saponification product of an ester-acid reaction product of from 0.5 to 1.1 mols of refined tall oil fatty acids and one mol of refined tall oil rosin acids containing at least an amount of methylolated rosin acids substantially equivalent to the molal amount of said fatty acids, said ester-acid product having an acid number not higher than the sum of an acid number not higher than 110 for the equivalent molal amounts of fatty acids and methylolated rosin acids plus the acid number of the rosin acids in excess of the amount equivalent to the molal amount of fatty acids, said alkali metal saponification product having an acid value of 0–50.

9. Paper comprising a water-laid web of cellulosic fibers carrying alum-precipitated size in an amount in the range of 0.25% to 5% of the fibers on a dry basis, said size being the alkali metal saponification product of the reaction product of (1) 1 to 10 parts by weight of maleic anhydride and (2) an ester-acid reaction product of (a) from 0.5 to 1.1 mols of refined tall oil fatty acids and (b) one mol of refined tall oil rosin acids containing at least an amount of methylolated rosin acids substantially equivalent to the molal amount of said fatty acids, said ester-acid product having an acid number not higher than the sum of an acid number not higher than 110 for the equivalent molal amounts of fatty acids and methylolated rosin acids plus the acid number of the rosin acids in excess of the amount equivalent to the molal amount of fatty acids.

10. An aqueous paste for sizing paper having an acid value in the range of 0–50 and containing water and from 60% to 80% of size solids which are the alkali metal saponification product of an ester-acid of refined tall oil fatty acids and about an equivalent molal amount of methylolated refined tall oil rosin acids, said ester-acid having an acid value not substantially higher than 110, and the alkali metal saponification product of a rosin in an amount of up to 50% by weight of said ester-acid.

11. An aqueous paste for sizing paper having an acid value in the range of 0–50 and containing water and from 60% to 80% of size solids which are the alkali metal saponification product of the reaction product of (1) 1 to 10 parts by weight of maleic anhydride and (2) an ester-acid of refined tall oil fatty acids and about an equivalent molal amount of methylolated refined tall oil rosin acids, said ester-acid having an acid value not substantially higher than 110, and the alkali metal saponification product of a rosin in an amount of up to 50% by weight of said ester-acid.

References Cited by the Examiner

UNITED STATES PATENTS

| | | | |
|---|---|---|---|
| 2,744,889 | 5/56 | Gayer | 260—97.5 |
| 2,791,502 | 5/57 | Hess | 162—179 |
| 2,934,468 | 4/60 | Stradins | 162—180 |

FOREIGN PATENTS 859,787  1/61  Great Britain.

DONALL H. SYLVESTER, *Primary Examiner.*

MORRIS O. WOLK, *Examiner.*